(12) United States Patent
Sakairi

(10) Patent No.: US 8,978,898 B2
(45) Date of Patent: Mar. 17, 2015

(54) FILTER

(75) Inventor: Shigemitsu Sakairi, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/391,830

(22) PCT Filed: Aug. 25, 2009

(86) PCT No.: PCT/JP2009/064746
§ 371 (c)(1),
(2), (4) Date: Feb. 23, 2012

(87) PCT Pub. No.: WO2011/024253
PCT Pub. Date: Mar. 3, 2011

(65) Prior Publication Data
US 2012/0152820 A1  Jun. 21, 2012

(51) Int. Cl.
*B01D 29/27* (2006.01)
*B01D 29/00* (2006.01)

(52) U.S. Cl.
CPC ............ *B01D 29/27* (2013.01); *B01D 2201/24* (2013.01); *B01D 2201/307* (2013.01); *B01D 2201/34* (2013.01); *Y10S 55/26* (2013.01)
USPC ........... 210/455; 210/448; 210/450; 210/452; 55/380; 55/DIG. 26

(58) Field of Classification Search
USPC ................. 210/450–455, 489, 448, 483, 488; 55/380, DIG. 26
See application file for complete search history.

(56) References Cited

U.S. PATENT DOCUMENTS

| | | | |
|---|---|---|---|
| 4,133,769 A | 1/1979 | Morgan, Jr. | |
| 4,204,966 A | 5/1980 | Morgan, Jr. | |
| 4,929,352 A | 5/1990 | Wolf | |
| 5,376,271 A | 12/1994 | Morgan, Jr. | |
| 5,624,559 A | 4/1997 | Levin et al. | |

(Continued)

FOREIGN PATENT DOCUMENTS

| | | |
|---|---|---|
| CN | 2382458 Y | 6/2000 |
| CN | 2608099 Y | 3/2004 |

(Continued)

OTHER PUBLICATIONS

German Office Action issued May 18, 2012, in German Patent Application No. 11 2009 005 169.3.

(Continued)

*Primary Examiner* — Nam Nguyen
*Assistant Examiner* — Madeline Gonzalez
(74) *Attorney, Agent, or Firm* — Oblon, McClelland, Maier & Neustadt, L.L.P.

(57) ABSTRACT

A filter including a container and a basket which is contained in the container and has mounted thereto a bag-like filter element and filtering liquid to be processed by allowing the liquid to pass through the filter element. The filter includes an upper tubular section forming the upper part of the basket and having an upper end open, and an annular seal mounted inside the container and held between the upper tubular section and the container. The upper tubular section has a first fitting surface having an outer diameter decreasing downward. The seal has a second fitting surface having an inner diameter which decreases downward and engaging with the first fitting surface. When the seal receives force acting outward radially from the upper tubular section, compressive deformation of the seal is limited to a predetermined amount.

6 Claims, 7 Drawing Sheets

(56) References Cited

U.S. PATENT DOCUMENTS 6,136,192 A 10/2000 Booth et al.
6,245,130 B1 * 6/2001 Maybee et al. .................. 95/286

FOREIGN PATENT DOCUMENTS

| CN | 101012861 A | 8/2007 |
|----|-------------|--------|
| JP | 53 16052 | 4/1978 |
| JP | 60 150498 | 10/1985 |
| JP | 62 34405 | 7/1987 |
| JP | 7-68106 A | 3/1995 |
| JP | 7 265614 | 10/1995 |
| JP | 3054585 | 12/1998 |
| JP | 2003 154213 | 5/2003 |
| JP | 2008 93644 | 4/2008 |
| JP | 2010-524665 A | 7/2010 |

OTHER PUBLICATIONS

International Search Report Issued Dec. 1, 2009 in PCT/JP09/64746 Filed Aug. 25, 2009.

Combined Chinese Office Action and Search Report issued Sep. 12, 2013, in Patent Application No. 200980161105.2 (with English-language translation).

Office Action issued Aug. 26, 2013, in Korean Patent Application No. 10-2012-7004882 (with English translation of pertinent portion).

* cited by examiner

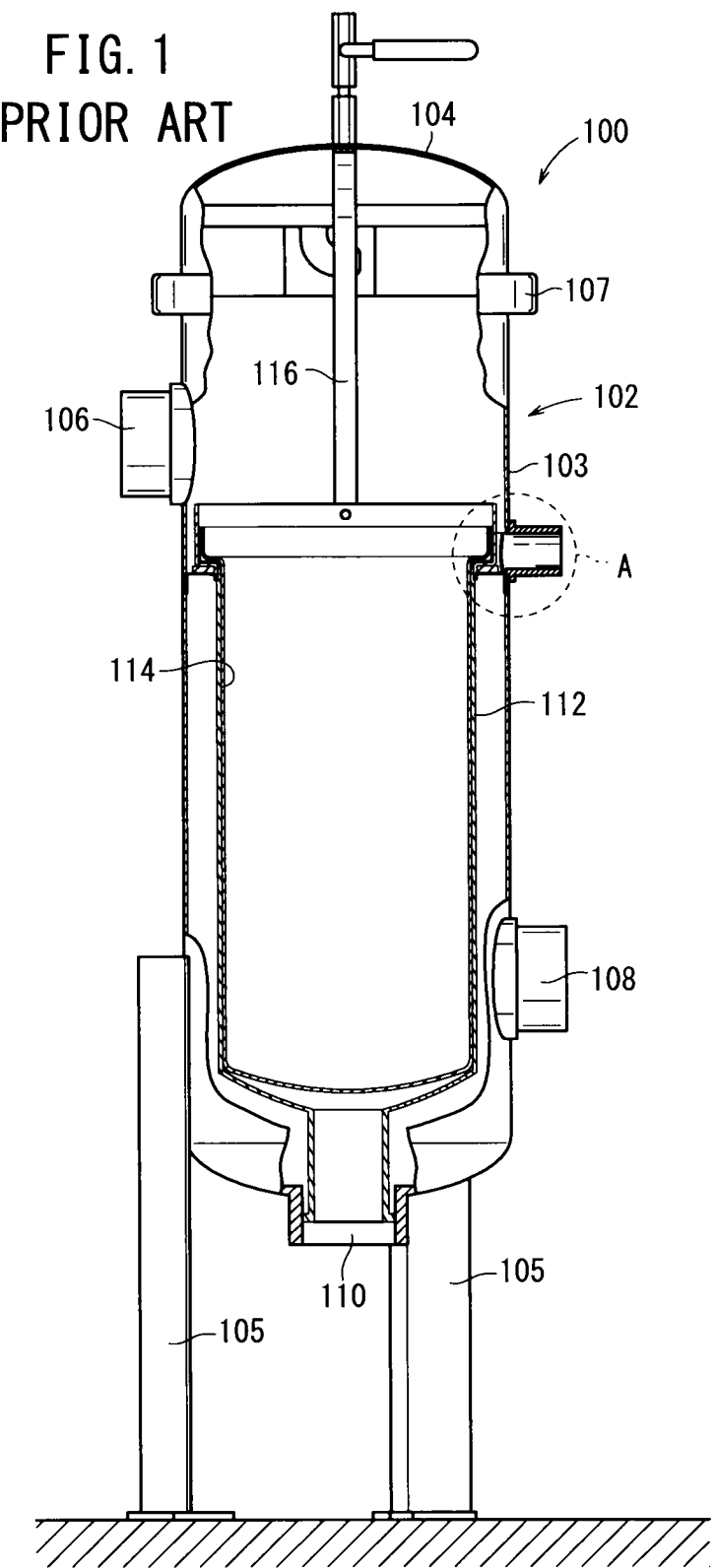

FILTER

TECHNICAL FIELD

The present invention relates to a filter for filtering a liquid that serves as an object to be processed.

BACKGROUND ART

Heretofore, as one type of filter, which filters a liquid that serves as an object to be processed, a bag filter, which utilizes a bag element, is known (see, e.g., Japanese Laid-Open Patent Publication No. 2003-154213 and Japanese Laid-Open Patent Publication No. 2008-093644). FIG. 1 is a vertical cross-sectional view showing a conventional example of a bag filter 100. As shown in FIG. 1, the bag filter 100 comprises a container 102 and a plurality of legs 105 supporting the container 102.

The container 102 includes a casing 103, the upper end of which is open, and which forms a main body section of the container 102, and a dome-shaped cover 104 that closes the upper end of the casing 103. The cover 104 closes and seals the upper end of the casing 103 in a condition where a gasket (not shown) is disposed between the casing 103 and the cover 104. The cover 104 and the casing 103 are fixed together by wrapping a ring-shaped tightening band 107 therearound and tightening the same.

The casing 103 includes an inlet port 106 disposed on an upper side of an outer peripheral surface thereof, through which a liquid to be processed (filtered) is introduced, and a discharge port 108 disposed on a lower side of the outer peripheral surface thereof, through which the filtered liquid is discharged. On a lower portion of the container 102, a liquid removal port 110 is further provided for discharging liquid that has collected in the container 102, for example when a maintenance operation is carried out. Respective tubes (not shown) are connected to the inlet port 106, the discharge port 108 and the liquid removal port 110. A basket 112 is installed inside the container 102. The basket 112 is a cylindrical shaped container having an open upper portion. A bag-like filter element 114 (see FIG. 2A) is accommodated inside the basket 112.

FIG. 2A is a perspective view of the basket 112 and the filter element 114. As shown in FIG. 2A, an inverted U-shaped pressing member 116 is connected to an upper edge of the basket 112. In a state where the casing 103 is closed by the cover 104, the basket 112 receives a downwardly directed pressing force from the pressing member 116 due to the cover 104 pressing down on the pressing member 116.

FIG. 2B is an enlarged view of a portion A shown in FIG. 1. As shown in FIG. 2B, the basket 112 includes an upper tubular portion 118 forming the upper part of the basket 112, and a cylindrical shaped main body section 120 formed with a reduced diameter, which is smaller than that of the upper tubular portion 118, and in which a major part of the filter element 114 is accommodated. The main body section 120 is formed from a metal mesh or a perforated (porous) metal plate.

An annular gasket receiving member 122 is placed in intimate contact with the inner circumferential surface of the casing 103. The basket 112 is supported by the gasket receiving member 122 through a ring-shaped flat gasket 124, which is mounted on the gasket receiving member 122. As described above, because the basket 112 receives a downwardly directed force from the pressing member 116, due to the flat gasket 124 being pressed by such a pressing force, a seal is formed between the basket 112 and the gasket receiving member 122. Such a seal has the object of preventing leakage of unfiltered liquid toward the side of the discharge port 108.

SUMMARY OF INVENTION

Incidentally, in the aforementioned conventional example, although a sealing function is brought about by pressing the bottom end surface of the upper tubular portion 118 of the basket 112 against the flat gasket 124, because the pressing force tends to be unstable, the sealing function also is unstable, and a problem results in that the reliability of the sealing function is inferior. Further, in the case that a structure is adopted in which, in place of the seal structure employing the flat gasket 124, sealing is performed by a cylindrical shaped rubber seal, which is provided between the outer cylindrical surface of the basket 112 and the inner circumferential surface of the casing 103, even though an improved sealing function can be expected, a further problem results in that removal of the basket 112 (to exchange the filter element 114) is complicated by the fact that the basket 112 is fitted strongly and bites into the rubber seal. More specifically, with the conventional technique, achieving both "stability of the sealing function" and "ease in removal of the basket" is complicated.

The present invention has been made taking into consideration the aforementioned problems, and has the object of providing a filter in which both stability of the sealing function and ease in removal of the basket can simultaneously be accomplished.

For achieving the aforementioned object, the present invention is characterized by a filter provided with a container and a basket, which is contained within the container and has mounted thereto a bag-like filter element for filtering a liquid to be processed by allowing the liquid to pass through the filter element, comprising an upper tubular section forming an upper part of the basket and having an open upper end, and an annular seal mounted inside the container and retained between the upper tubular section and the container. The upper tubular section has a first fitting surface having an outer diameter that decreases downwardly, and the seal has a second fitting surface having an inner diameter that decreases downwardly, the second fitting surface engaging with the first fitting surface, wherein compressive deformation of the seal brought about by a force acting in a radial outward direction from the upper tubular section is limited to a predetermined amount.

According to the present invention described above, since the upper tubular section includes a tapered first fitting surface, and the seal has a tapered second fitting surface, which engages with the first fitting surface, in accordance with an increase in the amount by which the basket is inserted into the container, the outer diameter of a portion of the upper tubular section, which comes into contact with the inner circumferential surface of the seal, increases. Owing thereto, since a strong pressing force directed toward the radial outward side is obtained, a stable sealing function also is obtained. Further, with the present invention, along with the outer diameter of the portion of the upper tubular section, which contacts the inner circumferential surface of the seal, becoming greater, the amount of compressive deformation of the seal increases. However, because the seal includes a compression amount limiting function, which limits to a predetermined amount the maximum compressive deformation of the seal brought about by a force acting in a radial outward direction from the upper tubular section, excessive compressive deformation of the seal is prevented. More specifically, by limiting the compressive deformation amount of the seal to a predetermined amount, strong biting in of the seal by the basket is prevented.

Consequently, according to the present invention, both stability of the sealing function and ease in removal of the basket can simultaneously be accomplished.

Further, in the aforementioned filter, the seal comprises an annular first seal member made of an elastic body, which is in intimate contact with an outer circumferential surface of the upper tubular section, an annular second seal member made of an elastic body, which is in intimate contact with an inner circumferential surface of a seal retaining member provided inside the container, and an annular holder that retains the first seal member and the second seal member. The holder includes an annular seal retaining groove on an inner circumferential side thereof in which the first seal member is accommodated, such that when compressive deformation of the first seal member brought about by a force acting in a radial outward direction from the upper tubular section reaches a predetermined amount, the first seal member abuts against the outer circumferential surface of the upper tubular section and the compressive deformation in excess of the predetermined amount is prevented.

According to the above configuration, the maximum compressive deformation amount of the first seal member is determined by the inner diameter of the first seal member and the depth of the seal retaining groove, and therefore, the maximum amount of compressive deformation of the first seal member can easily be set to a predetermined amount.

Further, in the aforementioned filter, the first seal member and the second seal member are arranged in the holder at positions separated in an axial direction.

According to the above configuration, by arranging the first seal member and the second seal member so as to be separated in the axial direction, since the first seal member and the second seal member do not interfere with one another in the radial direction, the thickness of the holder in the radial direction can be made thinner, and as a result, the wall thickness in the radial direction of the seal is thin and the seal can be made compact.

In accordance with the interior structure of the filter of the present invention, both stability of the sealing function and ease in removal of the basket can be realized simultaneously.

BRIEF DESCRIPTION OF DRAWINGS

FIG. 1 is a vertical cross-sectional view showing a conventional example of a bag filter;

DESCRIPTION OF EMBODIMENTS

Below, and explanation shall be given with reference to the drawings of an embodiment of the present invention.

Figure 3:
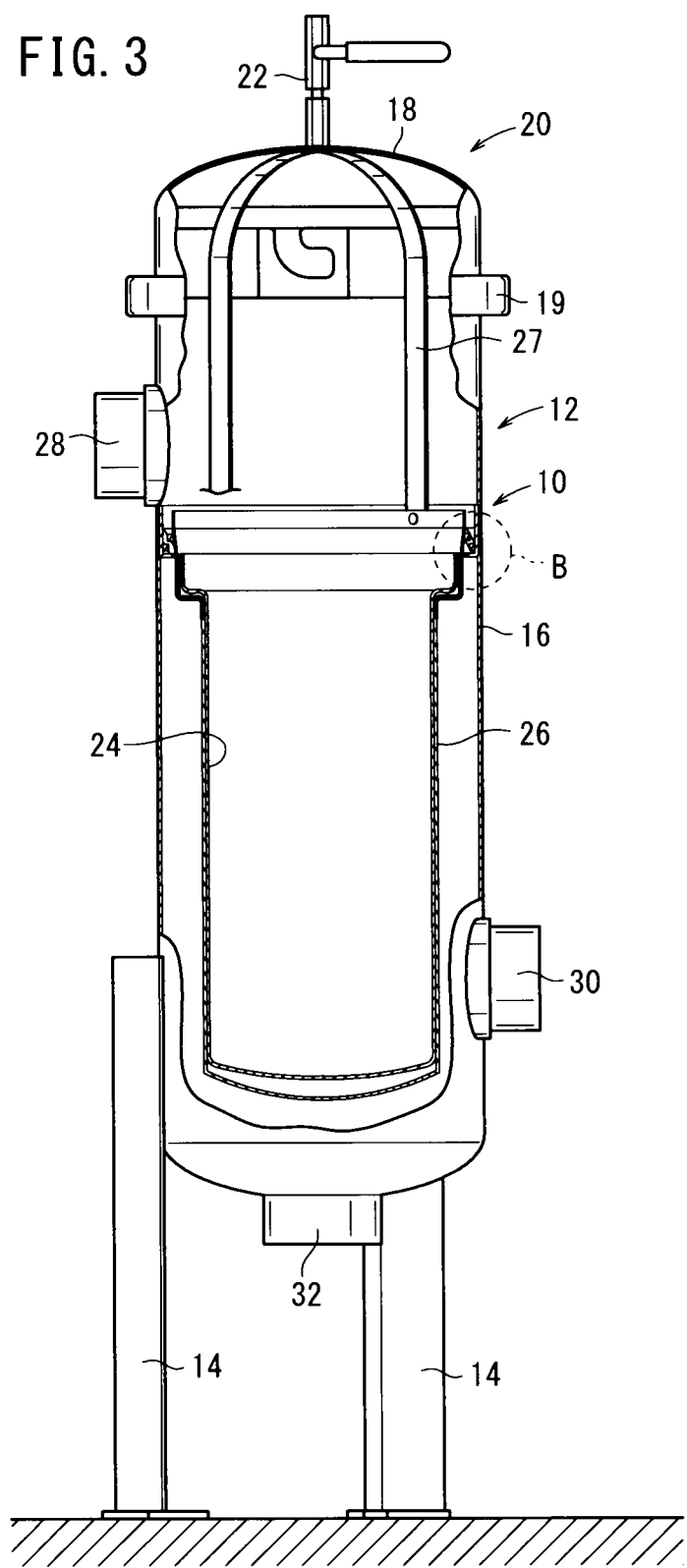
FIG. 3 is a vertical cross-sectional view showing a bag filter that is incorporated in the internal structure of a filter according to an embodiment of the present invention.

FIG. 3 is a vertical cross-sectional view showing a bag filter 20 that forms the filter according to an embodiment of the present invention. As shown in FIG. 3, the bag filter 20 includes a container 12, and a plurality of legs 14 assembled onto a lower portion of the container 12.

The container 12 is a portion that functions as a main body of the bag filter 20, and contains a cylindrical casing 16 having an open upper end, and a dome shaped cover 18, which hermetically closes the opening at the open upper end of the casing 16. A flange portion (not shown), which bulges outwardly in a radial direction, is formed at the upper end of the casing 16. A flange portion (not shown), which bulges outwardly in a radial direction, also is formed on the lower end of the cover 18. An annular o-ring (not shown) is interposed between the cover 18 and the casing 16. By wrapping a tightening band 19 including a latch member (not shown) around the flange portions of the cover 18 and the casing 16, and constraining the tightening band 19 in a tightened state by operation of the latch member, the cover 18 and the casing 16 are fixed together tightly so as to hermetically seal the container 12. An air release valve 22, for bringing the internal pressure to zero when the container 12 is opened to perform maintenance thereon or the like, is provided at the top or apex of the cover 18.

A bag-like filter element 24 for removing foreign matter (solid components) contained within a liquid to be processed is arranged in the interior of the casing 16. The filter element 24 is formed as a bottomed tubular-shaped member that opens upwardly, which is formed, for example, from polyester or polypropylene fibers or the like. Further, a basket 26 is installed in the interior of the casing 16. The basket 26 is formed by a cylindrical container, which is closed at the bottom and opened at an upper portion thereof, with the filter element 24 accommodated in the interior of the basket 26. The liquid to be processed, for example, is a coolant liquid, a cleaning solution, a cutting oil, industrial water or the like, in which foreign matter such as solid components or the like is mixed.

Figure 2A:
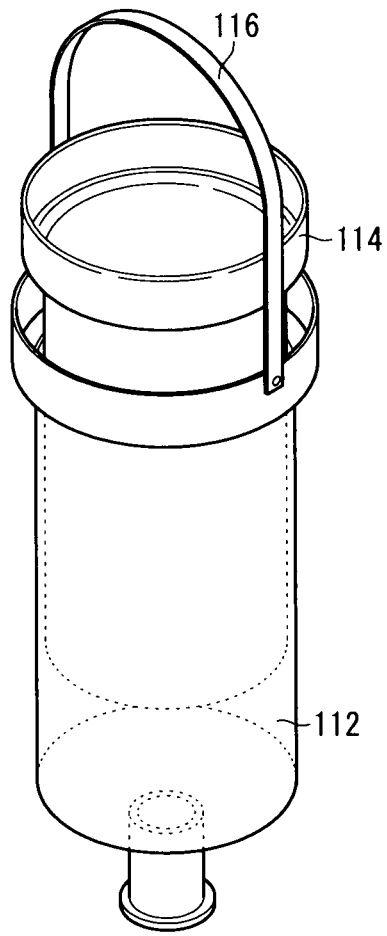
FIG. 2A is a perspective view of the basket and a filter element in the conventional bag filter.
Figure 2B:
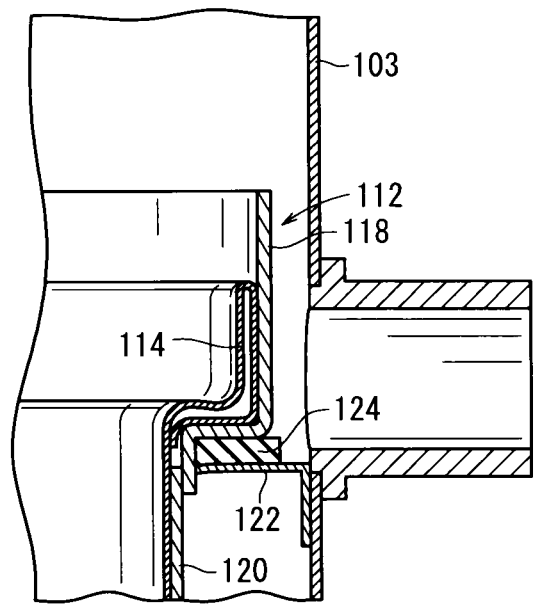
FIG. 2B is an enlarged view of a portion A shown in FIG. 1.

A pressing member 27, which is formed in an inverted U-shape similar to the pressing member 116 shown in FIG. 2, is connected to an upper end of the basket 26. In a state in which the casing 16 is closed by the cover 18, by the cover 18 pressing downwardly on the pressing member 27, the basket 26 receives a pressing force from the pressing member 27.

An inlet port 28 for introducing a liquid to be processed is disposed so as to project on an upper side on the outer peripheral surface of the casing 16. A discharge port 30 for discharging the processed liquid is disposed so as to project on a lower side on the outer peripheral surface of the casing 16. The filter element 24 is arranged on a liquid flow path inside the container 12 between the inlet port 28 and the discharge port 30.

A liquid removal port 32 for discharging liquid that has collected in the container 12, for example when a maintenance operation is carried out, is further provided on a lower portion of the casing 16. Dedicated tubes (not shown) are connected respectively to the inlet port 28, the discharge port 30, and the liquid removal port 32.

In the bag filter 20 constructed in the foregoing manner, when liquid to be processed, which contains foreign matter (solid components) therein, is introduced into the container 12 through the inlet port 28, solid-liquid separation is performed by capturing the foreign matter through use of the filter element 24. Stated otherwise, the liquid is filtered and foreign matter in the liquid is removed. In addition, the liquid that has been filtered by the filter element 24 is discharged to the outside through the discharge port 30.

The legs 14 form structural elements for supporting the container 12 in an upright condition, comprising a plurality of legs 14 (in the illustrated example, three), which are fixed to a lower side on the outer peripheral surface of the casing 16 positioned at intervals in the circumferential direction thereof. As shown in FIG. 3, each of the legs 14 is fixed to the casing 16 by welding, although the legs 14 may be fixed thereto by other fastening means, such as fastening by bolts or the like. Further, in the structural example shown in FIG. 3, the respective legs 14 extend vertically and are arranged in parallel with each other. However, in place of this structure, the legs 14 may be arranged respectively so as to spread or fan out from one another downwardly. Further, the number of legs 14 is not limited to three, but may be four or more. In this case, the legs 14 are arranged at equal intervals in the circumferential direction, so as to be capable of stably supporting the container 12.

Figure 4:
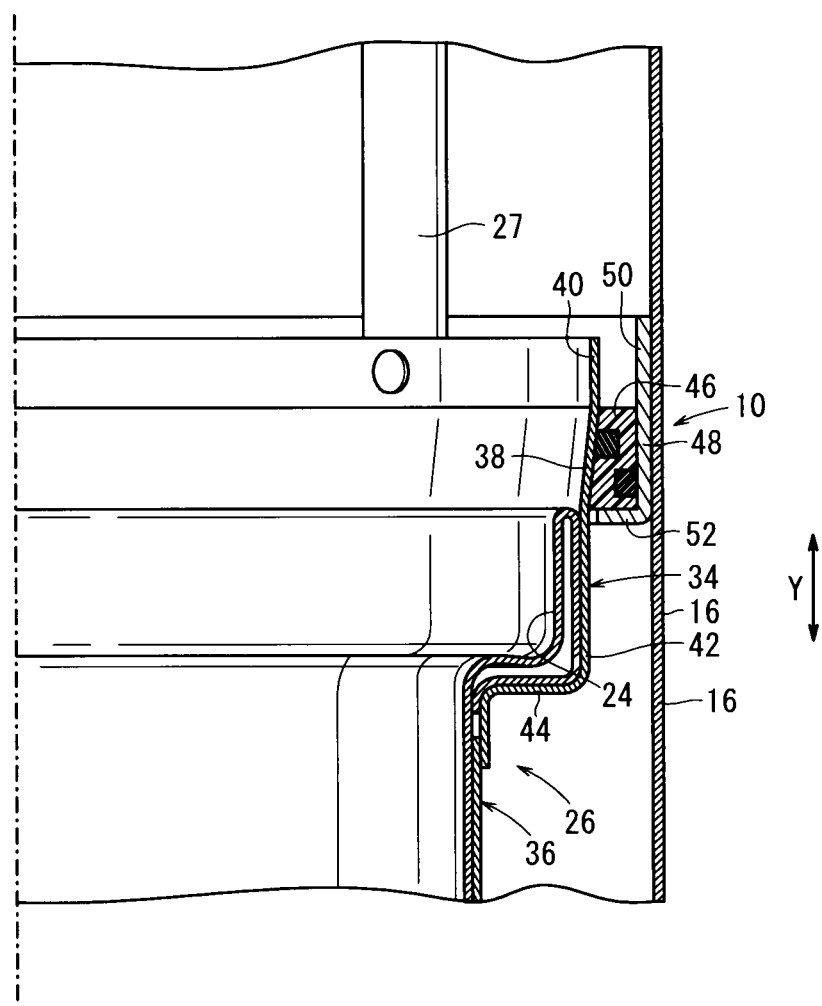
FIG. 4 is an enlarged view of a portion B shown in FIG. 3.

A seal structure 10 seals the region between the basket 26 and the casing 16. FIG. 4 is an enlarged view of a portion B shown in FIG. 3, which also is an enlarged cross sectional view, with partial omission, showing the seal structure 10 and the vicinity thereof. As shown in FIG. 4, the basket 26 includes an upper tubular section 34 that forms an upper part of the basket 26, and a cylindrical main body section 36 connected to the lower portion of the upper tubular section 34 and which accommodates a major part of the filter element 24 therein. The main body section 36 is formed from a metal mesh or a perforated (porous) metal plate, which is formed to be smaller in diameter than the upper tubular section 34.

The upper tubular section 34 includes a tapered portion 38 the outer diameter of which is progressively reduced in diameter downwardly, an upper parallel portion 40 connected to an upper end of the tapered portion 38 and having an outer diameter which is fixed along the axial direction (in the direction of the arrow Y), a lower parallel portion 42 connected to a lower end of the tapered portion 38 and having an outer diameter which is fixed along the axial direction, and a shoulder portion 44 that joins the lower end of the lower parallel portion 42 and the upper end of the main body section 36.

In the container 12 (i.e., inside the casing 16), an annular seal 46 is arranged between the upper tubular section 34 and the casing 16. The region between the basket 26 and the container 12 (casing 16) is sealed by the seal 46, such that leakage of unfiltered liquid toward the side of the discharge port 30 is prevented.

A seal retaining member 48 for retaining the seal 46 is disposed in the casing 16. As shown in FIG. 4, the seal retaining member 48 includes a hollow cylindrical side wall 50 adhered to the inner circumferential surface of the casing 16, and a ring shaped bottom plate 52 that extends inwardly in a diametrical direction from the lower end of the side wall 50. The inner diameter of the side wall 50 is set to be greater than the outer diameters of the upper parallel portion 40 and the tapered portion 38 of the upper tubular section 34, and therefore the upper tubular section 34 is capable of being inserted inside the seal retaining member 48. The inner diameter of the bottom plate 52 is set to be greater than the outer diameter of the lower parallel portion 42 of the upper tubular section 34, and therefore the lower parallel portion 42 of the upper tubular section 34 is capable of being inserted inside the bottom plate 52. Additionally, the seal retaining member 48 is placed in intimate contact with the outer circumferential surface of the seal 46 at the side wall 50, and by supporting the lower end surface of the seal 46 on the bottom plate 52, the seal 46 is retained at a predetermined position inside the casing 16.

Although as shown in FIG. 4 the side wall 50 of the seal retaining member 48 is formed as an element apart from the casing 16, the side wall 50 may also be formed integrally therewith as part of the inner wall of the casing 16.

Figure 5:
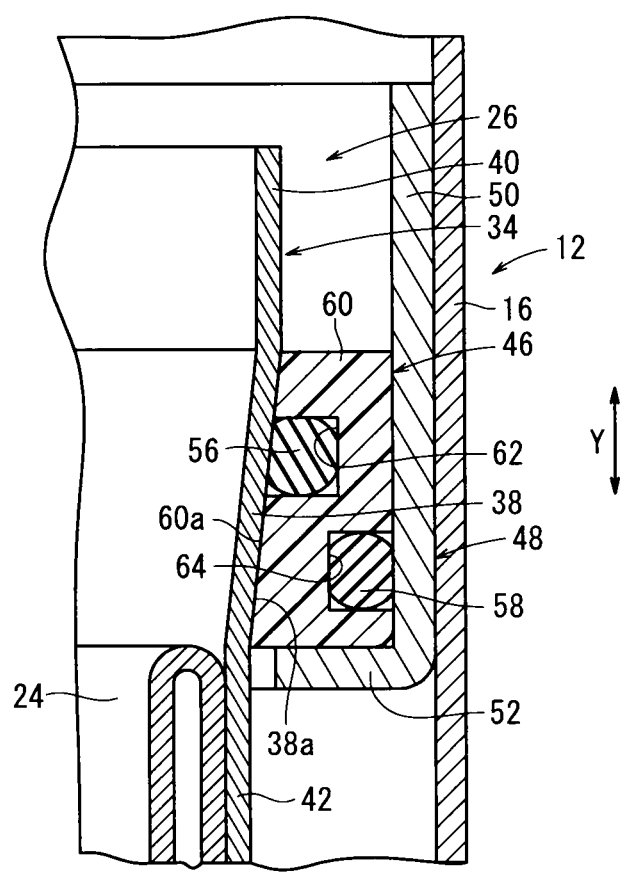
FIG. 5 is an enlarged cross sectional view, with partial omission, showing the seal and the vicinity thereof in a filter according to the embodiment of the present invention.

FIG. 5 is an enlarged cross sectional view, with partial omission, showing the seal 46 and the vicinity thereof. As shown in FIG. 5, the tapered portion 38 of the upper tubular section 34 includes a first fitting surface 38a the outer diameter of which is progressively reduced downwardly. The seal 46 includes a second fitting surface 60a the inner diameter of which is progressively reduced downwardly, and which engages with the first fitting surface 38a. The angle of inclination of the first fitting surface 38a with respect to the axial direction (the direction of arrow Y) is set to be substantially the same as the inclination of the second fitting surface 60a with respect to the axial direction.

Further, the seal 46 includes a deformation amount restricting function for limiting to a predetermined amount the compressive deformation of the seal 46, which is brought about by a force that acts in a radial outward direction from the upper tubular section 34. Details concerning the deformation amount restricting function will be described later.

Figure 6:
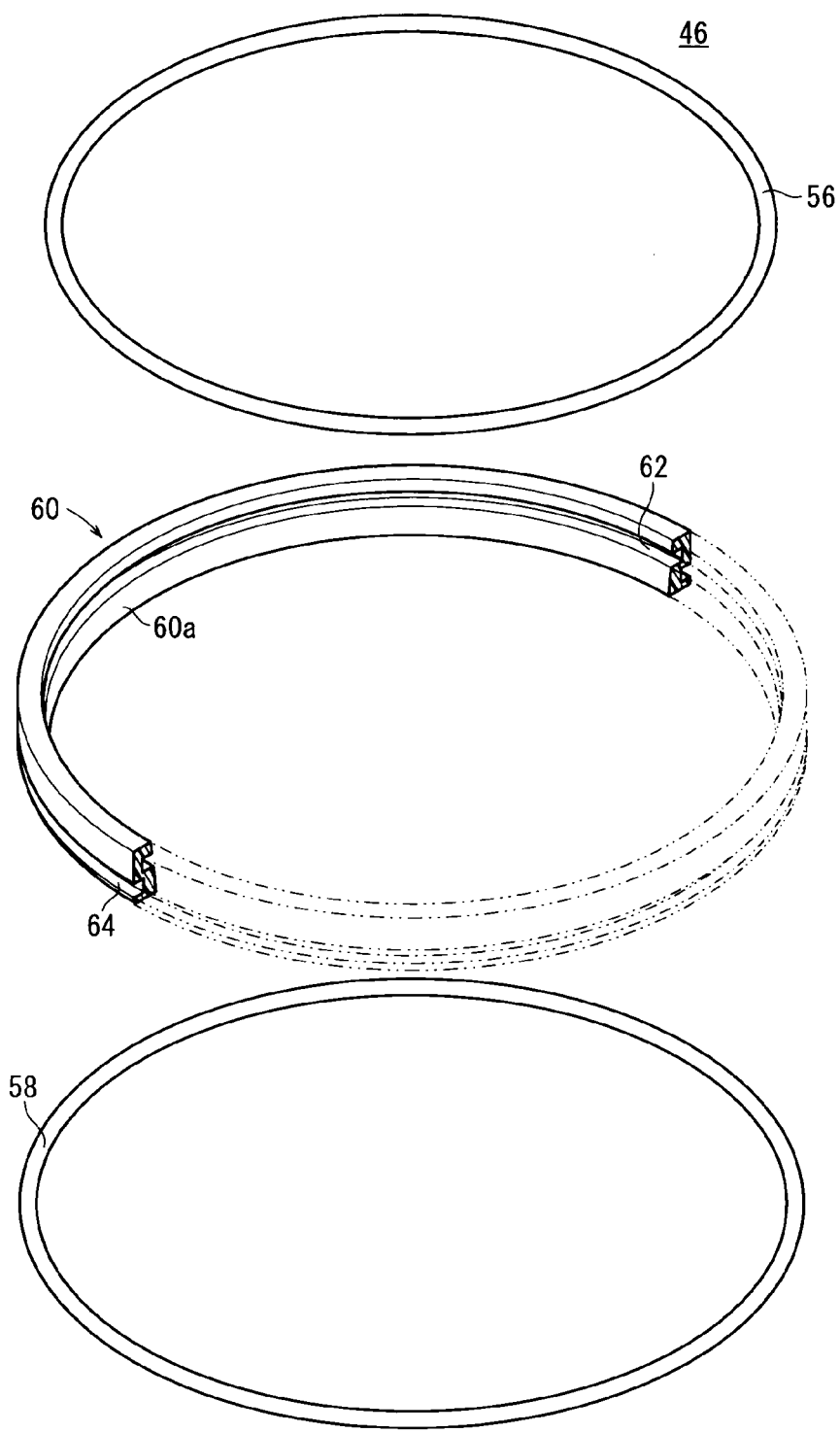
FIG. 6 is an exploded perspective view of the seal in the filter according to the embodiment of the present invention.

FIG. 6 is an exploded perspective view of the seal 46. As shown in FIGS. 5 and 6, the seal 46 includes an annular first seal member 56 made of an elastic body, which is in intimate contact with an outer circumferential surface of the upper tubular section 34, an annular second seal member 58 made of an elastic body, which is in intimate contact with an inner circumferential surface of the container 12, and an annular holder 60 that serves to retain the first seal member 56 and the second seal member 58. In the present embodiment, the first seal member 56 and the second seal member 58 are formed by o-rings. The first seal member 56 is elastically deformed and subjected to compressive deformation in a radial direction by a pressing force, which acts in a radial outward direction from the upper tubular section 34. Further, by being sandwiched and gripped between the holder 60 and the seal retaining member 48, the second seal member 58 also is elastically deformed and subjected to compressive deformation in the radial direction.

The aforementioned second fitting surface 60a is formed on the inner circumferential surface of the holder 60. Further, the holder 60 includes a first annular groove 62 (seal retaining groove) for holding the first seal member 56, and a second annular groove 64 for holding the second seal member 58. The first annular groove 62 is formed on the inner circumferential side of the holder 60, whereas the second annular groove 64 is formed on the outer circumferential side of the holder 60.

The holder 60 has a given strength (rigidity) of a suitable degree, such that the holder 60 is not subjected to compressive deformation by the pressing force, which acts in the radial outward direction, received from the upper tubular section 34. For example, the holder 60 is made of synthetic resin.

The depth of the first annular groove 62 is set such that an inner circumferential portion of the first seal member 56 projects outwardly from the inner circumferential surface (the second fitting surface 60a) of the holder 60, in a state in which the first seal member 56 is not compressed, i.e., a state in which a pressing force is not imposed thereon from the upper tubular section 34. Owing thereto, when the upper tubular section 34 of the basket 26 is fitted onto the seal 46, the first seal member 56 is placed in intimate contact with the first fitting surface 38a of the upper tubular section 34.

The depth of the second annular groove 64 is set such that an outer circumferential portion of the second seal member 58 projects outwardly from the outer circumferential surface of the holder 60, in a state in which the second seal member 58 is not compressed, i.e., a state in which the seal 46 is not fitted against the inner circumferential surface of the container 12 (the seal retaining member 48). The outer diameter of the holder 60 is slightly smaller than the inner diameter of the side wall 50 of the seal retaining member 48, while the outer diameter of the second seal member 58 in a non-compressed state is slightly greater than the inner diameter of the side wall 50 of the seal retaining member 48. Owing thereto, when the seal 46 is retained by the seal retaining member 48 in the container 12, the second seal member 58 is held in intimate contact with the inner circumferential surface of the casing 16 (the seal retaining member 48).

In the present embodiment, the first annular groove 62 and the second annular groove 64 are formed in the holder 60 at positions separated in the axial direction (the direction of the arrow Y). Owing thereto, the first seal member 56 and the second seal member 58 are arranged in the holder 60 at positions separated in the axial direction. With the structural example shown in FIG. 5, the first annular groove 62 is at a relative upper position, whereas the second annular groove 64 is at a relative lower position, and consequently, the first seal member 56 is at a relative upper position, whereas the second seal member 58 is at a relative lower position.

When the compressive deformation of the first seal member 56, which is caused by a force acting in a radial outward direction received from the upper tubular section 34, reaches a predetermined amount, the holder 60 functions to prevent excessive compressive deformation of the first seal member 56 in excess of the predetermined amount, upon abutment of the holder 60 against the outer circumferential surface (the first fitting surface 38*a*) of the upper tubular section 34.

Next, explanations shall be given concerning operations of the bag filter 20 according to the embodiment of the present invention constructed in the foregoing manner.

To install the basket 26 in the interior of the container 12 (casing 16), first, the seal 46 is mounted in the seal retaining member 48, which is disposed in the interior of the casing 16. More specifically, in a state where the cover 18 is removed from the casing 16, the seal 46 is fitted into the seal retaining member 48, which is disposed in the interior of the casing 16, through the opening at the upper end of the casing 16. Because the outer circumferential portion of the second seal member 58 projects outwardly from the outer circumferential surface of the holder 60, when the seal 46 is fitted onto the inner side of the seal retaining member 48, the second seal member 58 is sandwiched between the seal retaining member 48 and the holder 60 and a compressive force is imposed thereon, and due to the fact that the second seal member 58 is elastically deformed in the radial direction, the second seal member 58 is brought firmly into intimate contact against the inner circumferential surface of the side wall 50 of the seal retaining member 48. Consequently, the region between the seal 46 and the seal retaining member 48 is sealed.

Next, the basket 26 with the filter element 24 installed in the interior thereof is inserted into the interior of the casing 16 from above the casing 16, and the basket 26 is fitted into the seal 46. At this time, because on the basket 26 the first fitting surface 38*a* of the upper tubular section 34 is inclined, upon insertion of the basket 26, initially, the first seal member 56 abuts against the first fitting surface 38*a*. In addition, as the insertion amount of the basket 26 increases, or stated otherwise, as the position of the basket 26 in the interior of the casing 16 is lowered, the outer diameter of the first fitting surface 38*a* of the portion thereof in abutment with the first seal member 56 increases. Consequently, a compressive force is received upon the first seal member 56 being sandwiched and gripped between the holder 60 and the first fitting surface 38*a*, and by elastic compressive deformation thereof in the radial direction, the first seal member 56 is brought firmly into intimate contact against the first fitting surface 38*a*. Thus, sealing is effected between the seal 46 and the upper tubular section 34.

When the insertion amount of the basket 26 has reached the predetermined amount, because the first fitting surface 38*a* abuts against the inner circumferential surface (second fitting surface 60*a*) of the holder 60, further insertion of the basket 26 beyond this point is prevented by the holder 60. Additionally, in a state in which further insertion of the basket 26 is prevented, since the compressive deformation of the first seal member 56 due to a force received in the radial outward direction from the upper tubular section 34 does not increase, the amount of compressive deformation of the first seal member 56 is limited to a predetermined amount.

As discussed above, by means of the filter according to the present embodiment, the upper tubular section 34 includes the tapered first fitting surface 38*a*, while the seal 46 includes the tapered second fitting surface 60*a* that engages with the first fitting surface 38*a*. Thus, as the basket 26 is inserted downwardly, the outer diameter of the portion of the upper tubular section 34 that contacts the inner circumferential surface of the seal 46 becomes greater. Owing thereto, since a strong radially outwardly directed pressing force is acquired, a stable sealing function is obtained. Further, with the structure of the present invention, as the outer diameter of the portion of the upper tubular section 34 that contacts the inner circumferential surface of the seal 46 becomes greater, the amount of compressive deformation of the first seal member 56 likewise increases. However, because the seal 46 includes a compressive amount limiting function for limiting to a predetermined amount the compressive deformation of the first seal member 56, which is brought about by a force acting in a radial outward direction from the upper tubular section 34, excessive compressive deformation of the seal 46 is prevented. More specifically, by limiting the amount of the compressive deformation of the first seal member 56 to a predetermined amount, strong biting in of the seal 46 by the basket 26 is prevented. Consequently, removal of the basket 26 (e.g., to exchange the filter element 24) can be carried out easily, enabling an improvement in workability. Thus, according to the present invention, both stability of the sealing function and ease in removal of the basket 26 can simultaneously be accomplished.

In accordance with the filter according to the present embodiment, the maximum compressive deformation amount of the first seal member 56 is determined by the inner diameter of the first seal member 56 and the depth of the first annular groove 62 (seal retaining groove). Therefore, the maximum amount of compressive deformation of the first seal member 56 can easily be set to a predetermined amount.

In accordance with the filter according to the present embodiment, by arranging the first seal member 56 and the second seal member 58 so as to be separated in the axial direction, since the first seal member 56 and the second seal member 58 do not interfere with one another in the radial direction, the thickness of the holder 60 in the radial direction can be made thinner, and as a result, the wall thickness in the radial direction of the seal 46 is thin, and the seal 46 can be made compact.

The filter according to the present invention is not limited by the above-described embodiment, and it is a matter of course that various other or additional structural features could be adopted without deviating from the essence of the invention. For example, the following modified examples may be adopted.

Figure 7:
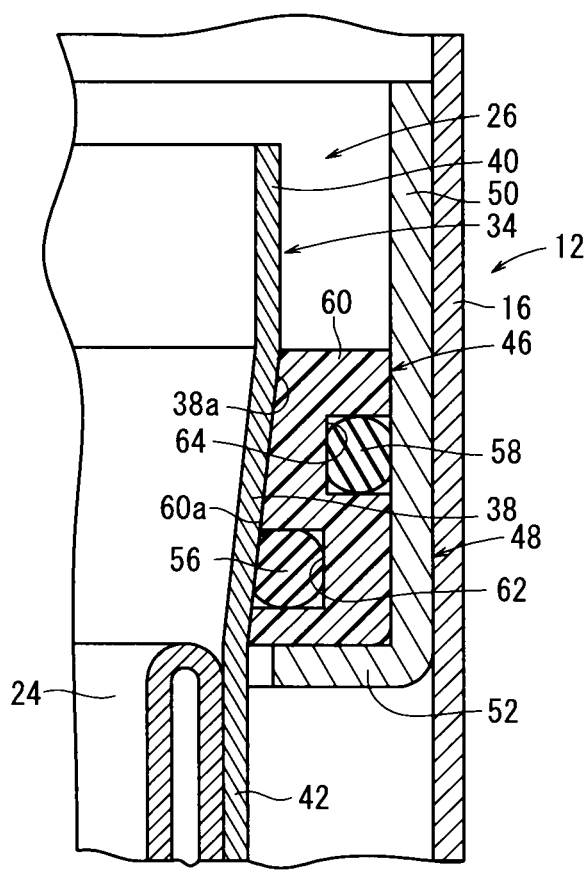
FIG. 7 is an enlarged cross sectional view, with partial omission, showing the seal and the vicinity thereof in a filter according to a modified example.

In the structural example shown in FIG. 5, concerning the relative positioning in the vertical direction of the first annular groove 62 and the second annular groove 64, the first annular groove 62 is set at an upper position and the second annular groove 64 is set at a lower position. Stated otherwise, the first seal member 56 is set at a relative upper position, whereas the second seal member 58 is set at a relative lower position. However, in place of this structure, the structure shown in FIG. 7 may be adopted. More specifically, as shown in FIG. 7, concerning the relative positioning in the vertical direction of the first annular groove 62 and the second annular groove 64 in the seal 46, the first annular groove 62 is set at a lower position and the second annular groove 64 is set at an upper position. Stated otherwise, the first seal member 56 is set at a relative lower position, whereas the second seal member 58 is set at a relative upper position.

A plurality of first seal members 56 may be placed at a given interval in the axial direction on the inner circumferential side of the holder 60. In this case, multiple first annular grooves 62 are formed corresponding to the number of first seal members 56.

A plurality of second seal members 58 may be placed at a given interval in the axial direction on the outer circumferential side of the holder 60. In this case, multiple second annular grooves 64 are formed corresponding to the number of second seal members 58.

The invention claimed is:

1. A filter provided with a container and a basket, which is contained within the container and has mounted thereto a bag-like filter element for filtering a liquid to be processed by allowing the liquid to pass through the filter element, comprising:
   an upper tubular section forming an upper part of the basket and having an open upper end, the upper tubular section including a tapered portion having an outer diameter that decreases downwardly, an upper parallel portion connected to an upper end of the tapered portion and having an outer diameter which is fixed along an axial direction, and a lower parallel portion connected to a lower end of the tapered portion and having an outer diameter which is fixed along the axial direction;
   a seal retaining member provided inside the container; and
   an annular seal mounted inside the container and retained between the upper tubular section and the seal retaining member,
   an outer circumferential surface of the tapered portion of the upper tubular section having a first fitting surface, and
   an inner circumferential surface of the seal having a second fitting surface having an inner diameter that decreases downwardly, the second fitting surface engaging with the first fitting surface, wherein compressive deformation of the seal brought about by a force acting in a radial outward direction from the upper tubular section is limited to a predetermined amount,
   wherein the seal comprises:
      an annular first seal member made of an elastic body, which is in intimate contact with the outer circumferential surface of the tapered portion of the upper tubular section;
      an annular second seal member made of an elastic body, which is in intimate contact with an inner circumferential surface of the seal retaining member; and
      an annular holder that retains the first seal member and the second seal member,
      wherein the holder includes the second fitting surface and an annular seal retaining groove on an inner circumferential side thereof in which the first seal member is accommodated, such that when compressive deformation of the first seal member brought about by the force acting in the radial outward direction from the upper tubular section reaches the predetermined amount, the second fitting surface abuts against the first fitting surface of the outer circumferential surface of the tapered portion of the upper tubular section and the compressive deformation of the first seal member in excess of the predetermined amount is prevented, and
   wherein the seal retaining member includes a hollow cylindrical side wall and a ring shaped bottom plate extending radially inward from a lower end of the side wall, an inner diameter of the side wall being greater than the outer diameters of the tapered portion and the upper parallel portion of the upper tubular section, and an inner diameter of the bottom plate being greater than the outer diameter of the lower parallel portion of the upper tubular section such that the upper tubular section forming the upper part of the basket is inserted inside the seal retaining member, and an outer circumferential surface of the seal is in intimate contact with the side wall and the bottom plate abuts a lower end surface of the seal such that the seal is retained at a predetermined position inside the container.

2. The filter according to claim 1, wherein the first seal member and the second seal member are arranged in the holder at positions separated in an axial direction.

3. The filter according to claim 1, wherein the holder includes another annular seal retaining groove on an outer circumferential side thereof in which the second seal member is accommodated.

4. The filter according to claim 1, wherein the upper tubular section includes a shoulder portion that joins a lower end of the lower parallel portion and an upper end of a main body section of the basket, the main body section of the basket accommodating a major part of the filter element therein.

5. The filter according to claim 1, wherein the side wall is adhered to an inner circumferential surface of a casing of the container.

6. The filter according to claim 1, wherein the side wall is formed integrally with an inner wall of a casing of the container.

* * * * *